June 27, 1961  W. J. KINDERMAN ET AL  2,989,976
STEAM TRAP CONTROL VALVE
Filed May 6, 1959  4 Sheets-Sheet 1

INVENTORS.
WALTER J. KINDERMAN
FRANK W. MILLER
BY
ATTORNEYS.

June 27, 1961 W. J. KINDERMAN ET AL 2,989,976
STEAM TRAP CONTROL VALVE

Filed May 6, 1959 4 Sheets-Sheet 2

INVENTORS.
WALTER J. KINDERMAN
FRANK W. MILLER
BY
ATTORNEYS.

United States Patent Office 2,989,976
Patented June 27, 1961

2,989,976
STEAM TRAP CONTROL VALVE
Walter J. Kinderman, Philadlephia, and Frank W. Miller, Laverock, Pa., assignors to Yarnall-Waring Company, Philadelphia, Pa., a corporation of Pennsylvania
Filed May 6, 1959, Ser. No. 811,380
20 Claims. (Cl. 137—183)

The present invention relates to steam trap control valves.

The present application is a continuation-in-part of our copending application Serial No. 353,388, filed May 6, 1953 for Steam Trap Control Valve and Method, now abandoned.

A purpose of the invention is to concentrate the high precision requirements on a steam trap control valve in a separate component which can be fabricated with maximum precision, of the most suitable material for that component, and by the most economical method of producing that component, to separately produce a valve plunger component which in the main does not require the same high precision, and to unite the components together by metallic fusion, while retaining the optimum precision and material characteristics of the precision component.

A further purpose is to combine the control valve flange which makes a leakage fit with the cylinder and the control valve orifice which regulates outlet discharge from the control chamber in a single disc, and to fabricate the disc by stamping.

A further purpose is to manufacture the orifice itself by a combination of piercing and forming, performed in either order, and thus to assure extension of processing (forming) lines in the longitudinal direction where they will exert a minimum tendency to cause turbulent flow and will not prevent maintenance of streamline flow which is most favorable to optimum trap operation.

A further purpose is to promote streamline flow in the orifice for a given machining finish so that metastable conditions in the discharging liquid will be maintained, assuring a minimum pressure in the control chamber and permitting the valve to remain open as close as possible to saturated steam temperature for the given relationship of clearance between the valve and the cylinder, on the one hand, and the orifice opening, on the other hand.

A further purpose is to produce a steam trap in which the construction of the control valve is most favorable to opening of the valve at a temperature very close to saturated steam temperature, since metastable conditions exist in the orifice.

A further purpose is to positively improve steam trap operation over that secured by a merely smooth orifice by introducing longitudinal grooves in the walls of the orifice.

A further purpose is to provide longitudinal grooves in the side wall of the control orifice of a steam trap, obtaining venting of steam from the jet by such grooves.

A further purpose is to provide such grooves having a depth of up to 8 percent and preferably up to only 6 percent of the minimum diameter of the orifice.

A further purpose is to introduce longitudinal grooves distributed symmetrically around the circumference of the orifice.

A further purpose is to contour the grooves smoothly in cross section.

A further purpose is to eliminate expensive machining operations and avoid the necessity of machining away large quantities of metal, and substitute inexpensive press operations.

A further purpose is to permit more accurate contouring of the approach portion of the orifice and particularly of the point of tangency of the approach portion with the throat of the orifice avoiding abrupt disconformity of the surface at that point.

A further purpose is to avoid the necessity of burnishing the orifice.

A further purpose is to obtain an orifice contour which is substantially invariable in shape, and avoid the necessity of matching a drilling and a reaming operation where the entrance curvature joins the throat.

A further purpose is to employ an orifice curvature on a radius which is between ⅜ and ¾ of the orifice diameter.

A further purpose is to avoid nonuniform discharge previously obtained on account of eccentricity in drilling by providing an abrupt enlargement of the diameter on the discharge side of the orifice where the leakage stream enters the bore on the interior of the control valve.

A further purpose is to use a relatively large bore through the part of the valve adjoining the flange and shorten the length of the relatively small bore which extends through the stem of the valve and which must be small in order to provide adequate wall thickness in the stem.

A further purpose is to utilize the construction just mentioned to promote cooling of the orifice wall, and thereby improve steam trap performance.

A further purpose is to permit separate heat treatment of the valve and the disc so that differing treatments can be employed, each most advantageous for the particular component and to unite the valve plunger and the disc by fusion of metal without destroying the effect of such heat treatments.

A further purpose is to permit preestablishment of hardening conditions in the disc, either by cold working or heat treatment, and to unite the disc to the valve plunger portion by a localized fusion method such as fusion welding, which does not raise the temperature of the disc either at the orifice or at the flange high enough to remote the hardness.

A further purpose is to employ a material for the disc which is specially adaptable to maintenance of high hardness, such as a heat treatable grade of stainless steel, and to use a material for the valve plunger which is tougher and is either non-heat treatable or less pronouncedly hardened by heat treatment.

Further purposes appear in the specification and in the claims.

The drawings illustrate a few only of the numerous embodiments in which the invention may appear, the forms shown being selected from the standpoints of convenience in illustration, satisfactory operation and clear demonstration of the principles involved.

FIGURE 21 is a diagrammatic fragmentary plan view from the entering side of an orifice according to the invention, showing a vapor envelope.

Describing in illustration but not in limitation and referring to the drawings:

In prior art steam traps of the type in which there is a main flow path through a valve seat opening past a valve and a separate leakage path around a valve piston into a control chamber and then through an orifice and usually through a passageway in a valve plunger to the outlet, there has been considerable difficulty and expense in making the valve plunger element. This is partly because the valve plunger normally has very marked differences in diameter and therefore under normal fabricating conditions necessitates the machining away of a great deal of stock, and also because a special surface contour is preferably maintained in order to give best results in the operation of the steam trap.

Even under most favorable conditions in prior art methods of manufacture it has been difficult to maintain metastable conditions in the liquid flowing through the orifice, particularly because processing lines (tool marks) produced in previous methods of manufacture have been detrimental to the maintenance of metastable conditions in the liquid flowing through the orifice.

Furthermore, it has been difficult to maintain the desired invariable entrance curvature on the orifice, and particularly to obtain a smooth demarcation between the entrance curvature and the throat of the orifice. Further experiments by the present inventors indicate that the radius of curvature on the entrance to the orifice has been excessive for best practice.

The prior art methods of manufacture have led to the production of a valve plunger which has not been of the most advantageous metallurgical character to stand up under operating conditions.

In accordance with the present invention these difficulties are largely overcome. The valve plunger is made from a composite construction consisting of a stamped valve disc and a machined valve plunger, which are joined together by metal fusion—suitably welding, brazing or silver soldering. The stamped disc is also desirably produced with the high precision surfaces located in the disc, thus permitting the manufacture of the plunger with markedly less precision.

The orifice itself is made by a combination of piercing and forming, and this assures a high degree of accuracy in the entrance curvature. In previous machining practice to form the orifice, as by drilling and reaming, there is commonly sufficient variation in size in the reaming to cause the entrance curvature to vary and produce a slight ridge or discontinuity where the entrance curvature joins with the throat of the orifice. This is very detrimental to good performance since it lowers the condensate discharge temperature for a given adjustment relationship of the leakage space between the piston and the control chamber cylinder, on the one hand, and the exit orifice, on the other hand. The punch and die in forming the orifice tend to maintain a smooth relationship between the entrance curvature and the throat diameter and this tends to improve with die operation during normal die life rather than to diminish.

There is another feature of the pierced and formed exit orifice which is highly advantageous. When the exit orifice is machined by a rotary tool, such as a reamer, there are inevitably tool marks (processing marks) which, however slight, extend circumferentially. The tool marks in a circumferential direction are definitely detrimental to trap operation as they make it difficult or impossible to maintain the desired metastable conditions in the liquid flowing through the orifice. Accordingly it has been necessary to minimize the effect of these circumferential processing marks by burnishing the entrance curvature of the orifice subsequent to machining. Even after burnishing, however, the effect of such residual tool marks is highly detrimental. In the production of the orifice including its entrance curvature by piercing and forming, on the other hand, it will be evident that any processing marks (tool marks) on the orifice extend longitudinally rather than circumferentially. The longitudinal tool marks have very little effect in producing turbulence which would cause equilibrium conditions to be established in the liquid flowing through the orifice. Accordingly it is possible to avoid burnishing and to obtain very much superior results than if burnishing is used. Higher condensate discharge temperatures of the trap are obtained in accordance with the present invention for a given margin of closing force on steam.

Using the pierced and formed orifice, produced in the separate piston disc, joined to the plunger element by welding or the like, several expensive machining operations are eliminated and very much less expensive press forming operations are substituted. Furthermore the high tool maintenance necessary to obtain even an approximation of accuracy on the orifice is avoided, and high accuracy in the orifice shape is obtained without appreciable die cost.

In the prior art it has generally been considered necessary to use an entrance curvature on the orifice having a radius of one throat diameter or greater. In accordance with the present invention it has been found that the trap will operate very successfully with an entrance curvature on a radius of between 3/8 and 3/4 of the throat diameter. Accordingly the projected area of the entrance curvature of the orifice is reduced and for any given press force, the pressure available for forming the orifice as in coining or the like is correspondingly increased. For best results in accordance with the present invention the radius of entrance curvature should be about 1/2 of the throat diameter. This reduction in radius of the entrance curvature is particularly suitable when used with the improvement in the surface and especially the avoidance of circumferential processing marks and preferably the presence of longitudinal processing marks, the higher degree of accuracy of the orifice and the better blending of the entrance curvature and the throat made possible by the press operation.

Using this character of entrance curvature, the length of the throat of the orifice can be relatively short, that is a minimum of one-half the throat diameter, reducing the over-all length of the orifice.

In accordance with the invention, tangency of the entrance curvature with the surface of approach normal to the orifice axis is not critical providing the angle of the entrance curvature at the intersection with the surface of the disc adjoining the entrance curvature does not exceed 20 degrees. This permits a slight additional reduction in over-all length of the orifice and brings the over-all orifice length within the thickness of sheet steel, with a minimum displacement of material, and with maximum economy of manufacture and improvement in performance.

The exposure to steam makes it highly important to use a corrosion resistant material such as stainless steel for the valve plunger. Of course the use of a material of this character introduces problems of machining. In the prior art where the piston and the valve plunger element were produced from the same piece, it was desirable to use heat treated stainless steel possessing toughness at a sacrifice in maximum hardness for the valve and this has required additional protection from wear at the piston edges as obtained by chromium plating for example. In accordance with the present invention, while the material previously used may be employed, a very much wider selection of materials is made possible, since the disc can be of one material, the valve plunger element can be of another material, and the two materials may be chosen so as to produce the most favorable properties for each part of the composite structure. Thus the valve plunger and the disc may be separately heat treated, or one may be heat treated and the other not heat treated, and the valve plunger and the disc can be joined together after heat treatment by flash welding, brazing or the like, which will not extend the heating appreciably beyond the location of the weld, and therefore will not destroy hardness obtained by previous heat treatment. Furthermore, since the piece used need not be heat treated subsequent to joining the disc and the valve plunger, distortion is reduced to a minimum. Of course it is desirable to remove or prevent scale in connection with the previous heat treatment so that the scale will not interfere with flash welding.

In some cases it is preferable to produce the composite piston valve from heat treatable corrosion resistant ferrous alloys which can be hardened after welding of the disc and the valve plunger element. Thus by appropriate selection of materials, adequate hardness of the disc can be obtained to dispense with chromium plating, consistent with desired toughness of the valve plunger when heat treated by a common procedure suitable for both component parts. The behavior of the composite welded piston valve in heat treatment is much superior to that of a riveted assembly, which loosens up at the riveted joint in heat treatment.

It will be understood of course that the amount of removal of stock in machining is greatly reduced in accordance with the invention, since the valve plunger element can be made from bar stock of reduced diameter and reduced cost. The machining of the valve plunger is further reduced by shortening the length of the small diameter central discharge opening by permitting oversized drilling along the major part of the length of the valve body. It is very difficult to keep a small axial drilled hole in accurate alignment, but it is much easier to produce a larger bore extending over part of the length. It furthermore becomes possible to produce the valve plunger element from tubular material thus eliminating the need for drilling entirely.

Figure 1:
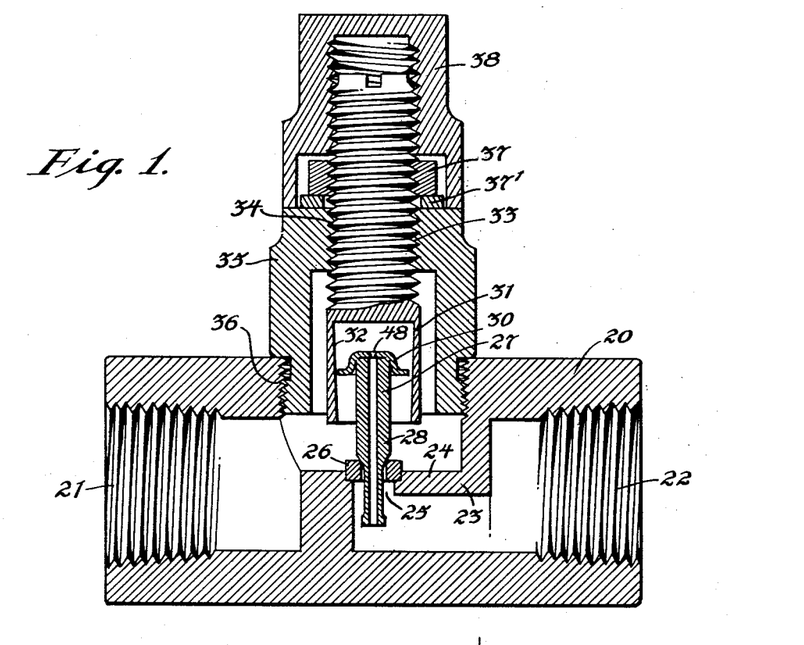
FIGURE 1 is a central vertical section of one form of steam trap to which the invention has been applied.

The steam trap of the invention comprises a body 20 having an inlet 21 and an outlet 22 which are suitably threaded to connect with adjoining piping. A partition wall 23 extends across the interior of the valve body and has a longitudinal shelf portion 24 which is provided with a valve seat opening 25 in which is secured a valve seat 26 united to the partition wall in any suitable manner, as by welding. The seat is a ring having a central opening through which the main discharge of the stream trap between the inlet and the outlet takes place.

Coaxial with the valve seat is a piston valve 27 shown more in detail in other figures, and consisting of a valve plunger element 28 united as by metal fusion to a piston disc 30 at the end of the valve plunger remote from the valve seat. Surrounding the piston disc 30 is a control chamber cylinder 31, which is tapered on its internal wall 32, being larger at the end remote from the valve seat and converging progressively toward the valve seat.

The cylinder wall 31 is mounted on an adjustment screw 33 suitably coaxial with the valve and valve seat, and threaded through a threaded opening 34 in a bonnet 35, which is threaded at 36 into an opening suitably at the top of the body.

The adjustment screw is desirably locked in any adjustment position by a lock nut 37 and washer 37' on the outside of the bonnet. The outer end of the adjustment screw and the lock nut and washer are suitably covered by a cap 38 threaded on the adjustment screw.

Figure 2:
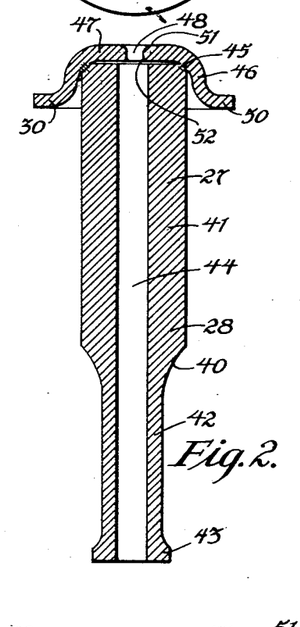
FIGURE 2 is an enlarged central longitudinal section of the valve plunger of the invention.
Figure 3:
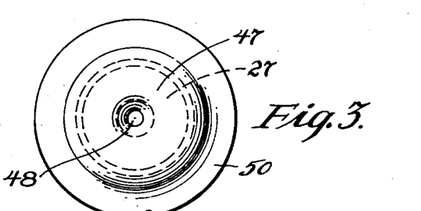
FIGURE 3 is a top plan view of FIGURE 2.

As best seen in FIGURES 2 and 3, the valve plunger comprises a suitably tapering or conical valve 40 which cooperates with the inner seat portion of the valve seat, a tubular plunger portion 41 extending toward the piston disc and a tubular stem 42 on the opposite side of the valve surface 40 from the plunger portion 41 and terminating at the end remote from the valve in an external annular enlargement 43 which by flow impingement aids in seating. A bore 44 of considerably larger diameter than the orifice throat, and suitably having a cross section of at least three times the orifice throat, extends from one end to the other of he valve plunger.

At the end of the valve plunger remote from the tail piece is placed the disc 30 united to the valve plunger by a fused metal union 45 which in the preferred embodiment is a flash weld (electric resistance weld under axial pressure), but may be brazing, or where the temperature permits, silver soldering. Less desirably filler metal welding may be used as through openings. The union 45 in the form of FIGURES 2 and 3 desirably extends all the way around the outer edge of the end of the plunger valve element.

The disc 30 in this form comprises a cupped portion 46 having a crosswall 47, and an orifice 48 at the center in line with the axis. At the outer edge the cup is outwardly flanged to form an annular piston 50 which makes a free fit with the reversed taper cylinder wall 32, the clearance between the outer edge of the piston and the interior of the adjoining cylinder wall being determined by the adjustment screw position as well known.

Figure 5:
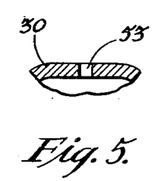
FIGURE 5 is a fragmentary central vertical section showing the piercing step forming the orifice.
Figure 6:
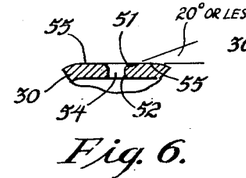
FIGURE 6 is a fragmentary central longitudinal section showing the forming step in producing the orifice.
Figure 15:
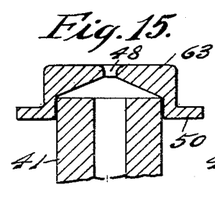
FIGURE 15 is a fragmentary axial section of a modified valve using a machined disc, prior to welding.
Figure 16:
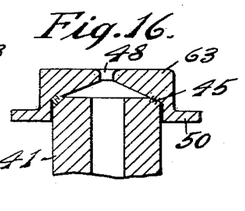
FIGURE 16 is a view of the valve of FIGURE 15 after fusion welding.

The orifice comprises an entrance curve 51 and a throat 52. The disc 30 is desirably fabricated by stamping a sheet, and can be of the order of 12 or 14 gage corrosion resisting ferrous alloy for the smaller trap elements and proportionally heavier for similar larger sized parts. The disc member can also be machined from bar stock as shown at 63 in FIGURES 15 and 16, and this may be more economical than stamping where special proportions not intended for mass production are desired. The formation of the orifice, which is one of the very important precision operations in making the control valve, is accomplished by a combination of piercing and forming. Thus FIGURE 5 illustrates the disc which has first been pierced at 53, and is subsequently formed at 54 as shown in FIGURE 6 to make the desired annular entrance curvatures 51 and the throat 52. As already explained in this form the entrance curvature will desirably be on a radius of from 3/8 to 3/4 times the throat diameter. The outside of the entrance curvature need not join the flat surface 55 of the crosswall of the cup at zero angle, but may permissibly be at an angle of 20 degrees or less as shown in FIGURE 6.

Figure 4:
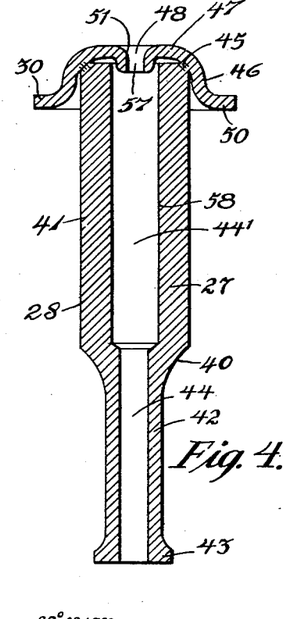
FIGURE 4 is a central longitudinal section of a modified form of valve plunger according to the invention.
Figure 7:
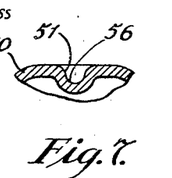
FIGURES 7 and 8 are longitudinal sections of a variant procedure for forming the orifice, FIGURE 7 illustrating the forming and FIGURE 8 the piercing.
Figure 8:
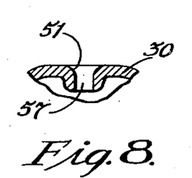
Figure 9:
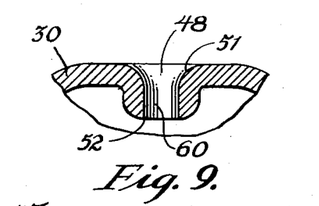
FIGURE 9 is a fragmentary enlarged longitudinal section showing the direction of the processing lines in the orifice produced according to the present invention.

In some cases it is preferred to form the disc first and then pierce afterwards in making the orifice, and FIGURE 4 shows a construction of this character. In FIGURE 7 the disc is shown first dimpled at 56 to produce the entrance curvature 51. Then as shown in FIGURE 8, the dimple is pierced at 57 to make the throat. This construction may produce a more elongated orifice, and permissibly may be used with a radius of entrance curvature greater than the range of 3/8 to 3/4 times the throat diameter, and suitably of the order of the throat diameter or larger. This form therefore does not necessarily give the advantage of the higher forming pressure for a given press load in making the entrance curvature.

As the drilling of the long bore 44 of a small enough diameter to go through the stem 42 with sufficient wall thickness is difficult and expensive, the form of FIGURE 4 employs a larger counterbore 58 in the portion of the bore 44′ going through the plunger extension 41, but uses the smaller bore 44 in the stem. This is possible because access can be obtained to the end of the plunger valve before the disc is welded on.

In the forms shown in FIGURES 2 to 8 inclusive, there is one common characteristic. The forming is by motion of the punch axially of the orifice 48, producing tool marks or processing marks 60 which extend longitudinally and therefore exert very little tendency to produce turbulence and prevent the maintenance of metastable conditions in the liquid flowing through the orifice, but instead are positively favorable.

Figure 10:
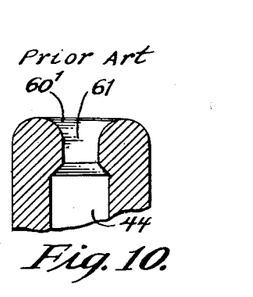
FIGURE 10 is a view similar to FIGURE 9 showing the machined orifice of the prior art and illustrating the direction of the processing lines.

FIGURE 10 shows a fragment of a prior art piston valve having a machined orifice 61, and in this case the processing marks or tool marks 60′ extend circumferentially. These have a great tendency to produce turbulence and prevent metastable conditions in the liquid flowing through the orifice.

In the forms of FIGURES 1 to 9, the curved portion at the outer edge of the crosswall of the cup engages the outer edge of the end of the valve plunger to give a limited area of contact for fusion welding, so that welding can be accomplished quickly without destroying the effects of previous heat treatment, if any, in the orifice, the piston portion, or the seat. Thus if the valve disc, of corrosion resisting ferrous alloy such as straight chromium stainless steel of the 14 percent chromium type has been hardened, and if the plunger valve element has also been heat treated, for example, to a lower hardness that will give greater toughness, the two may be joined together without destroying the effect of the heat treatment at the important points such as the orifice, the outside of the piston and the valve portion.

Figure 11:
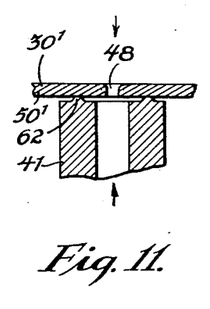
FIGURE 11 is a fragmentary longitudinal section showing the procedure for contouring the parts prior to welding.
Figure 12:
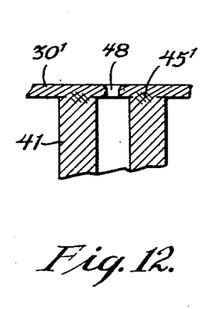
FIGURE 12 is a fragmentary longitudinal section showing the disc and plunger element of FIGURE 11 after welding.

In some cases it is preferred to use a piston contour, such as a piston extending straight out from the valve plunger, which would not ordinarily give a zone of limited contact which is convenient for flash welding without excessive over-all heating. In a case of this kind as shown in FIGURE 11, a projection welding ring 62 is formed on the end of the plunger valve, and a disc 30′ having the orifice 48 at the center and extending straight out to form a piston 50′ at the outer edge is welded on under axial pressure by flash welding technique to obtain an annular flash weld union 45′ between the disc and the valve plunger as shown in FIGURE 12.

Of course the projection ring for projection welding can be applied on the disc instead of on the end of the valve plunger.

Figure 13:
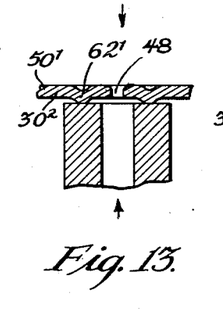
FIGURE 13 is a fragmentary longitudinal section showing an alternate way of forming the disc and plunger element prior to welding.
Figure 14:
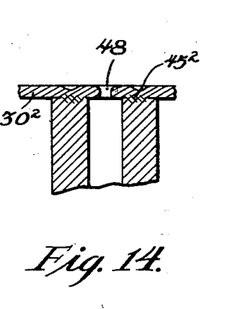
FIGURE 14 is a view similar to FIGURE 13 showing the result of welding the parts of FIGURE 13.

FIGURE 13 shows a disc $30^2$ having a projection ring 62′ which engages the end of the plunger valve. The disc has the orifice 48 at the center and the piston portion 50′ at the outside. Using electric resistance flash welding under axial pressure, a projection weld union $45^2$ extends around the outside surface of contact between the disc and the valve plunger.

In operation the valve of the present invention will function as described in detail in the remainder of the specification. As compared to the prior art, the device of the invention can be produced more economically and will give more uniform and more effective results, and will operate at increased condensate discharge temperature for a given margin of valve closure force on steam.

In order to better understand the proper functioning of the orifice of the present invention, it is desirable to appreciate some of the factors which influence orifice discharge under the general conditions with which we are here concerned.

It has been established that when the vapor pressure of water exceeds the external pressure along a free flowing stream discharging into the atmosphere, vapor is emitted from the surface of the stream.

If the stream is non-turbulent, it will remain clear in a metastable condition for a distance along the discharging jet or stream and a comparatively small supersaturation will form filaments or fan out into smaller streams at a distance.

Figure 17:
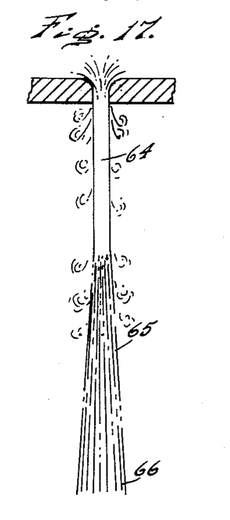
FIGURES 17 and 18 are diagrammatic axial sections to illustrate metastable flow without turbulence through a rounded entrance orifice, FIGURE 17 illustrating relatively low supersaturation and FIGURE 18 relatively high supersaturation with respect to the discharge pressure.

The filaments in turn form droplets similar to cold water discharge and steam is emitted along the flow path. Thus where we have water discharging from an initial pressure of 100 p.s.i.g. and 250° F. to atmospheric temperature and pressure, as shown in FIGURE 17 as one example, a clear jet 64 forms filaments 65 which change into droplets 66. This is typical of low supersaturation flow.

Figures 18, 23:
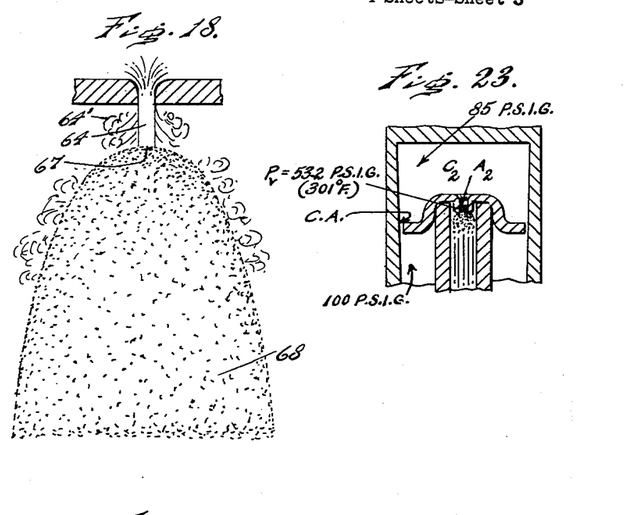
FIGURE 23 is a fragmentary enlarged axial section of a composite steam trap as in the present invention, but for purposes of illustration showing turbulent flow.

As the degree of superheat in the discharging liquid increases, the filament formation tends to fan out in a more pronounced manner and the initial transformation to droplets proceeds more rapidly. The initial transition also moves closer to the origin of the jet and as the temperature increases the transformation appears to approach a spontaneous change from a clear jet to droplets dispersed in vapor. As the temperature approaches the initial saturation condition, the transformation more closely approaches the orifice and becomes explosive in nature. At the point of expansion the form takes on a parabolic profile as distinguished from the original conical separation. FIGURE 18 shows the initial jet 64 from a source of water at 100 p.s.i.g. and 300° F., which is clear and blowing vapor outward at 64′, but which converts explosively at 67 forming fine droplets 68. This is characteristic of high supersaturation of the discharged flow. The nature of this flow behavior is described in "Fluid Flow of Two Orifices in Series—III," by W. J. Kinderman & E. W. Wales, ASME Transactions Paper 55–A–192, and "Metastable Flow of Saturated Water" by Joel F. Bailey, ASME Transactions Paper 51–SA–55.

In applying an orifice as a control element to perform a steam trap function, utilizing discharge through the orifice from a control chamber, it is desirable to obtain the most efficient evacuation of liquid from a control chamber consistent with the lowest possible discharge of steam through the same orifice.

On the basis of data and experimentation it has been found that the orifice should have a rounded entrance with a radius equal to one-half of the orifice throat diameter, with particular emphasis on smooth tangency at the throat and that the minimum parallel throat section should extend for a distance of one-half of the orifice throat diameter. Tests have established that the orifice radius is not as important in the area of approach greater than 45° from the center line tangency as in the area close to the center line tangency, but that machining lines which extend circumferentially as in FIGURE 10 are highly detrimental at or near the point of tangency of the entrance curvature with the throat. Thus in order to improve the functioning of an orifice of the character of FIGURE 10, polishing to remove the circumferential machining lines was important.

It has been found, however, that where the orifice is produced by stamping and forming to the required contour from thin sheet, axial grooves or working lines are formed in the wall of the orifice and there is a tendency to develop a natural curvature which is continuous at the juncture between the entering radius and the throat, thus eliminating the greatest detriment to performance which is characteristic of machining by rotating tools, which often tend to produce a line of demarcation between the radius and the throat.

However, a steam trap having a control chamber outlet orifice following out the teachings of our invention, including an otherwise completely smooth orifice with the longitudinal marks as herein specified, is more than just an approach in efficiency to a steam trap having such an orifice which is completely smooth; it is a positive improvement over it.

Specifically, in connection with the testing program, steam traps having punch formed orifices which had then been polished were supplied with equally circumferentially spaced fine scribed lines (specifically, lines of a depth of about 5% of the throat diameter in an orifice of about .040" throat diameter) running longitudinally through the throat and through the adjoining portion of the approach curvature area. Steam traps having orifices produced in this way gave exceptionally fine performance, beyond any expectation, and decidedly better than the same steam traps with the orifices in polished condition before the fine lines were put in.

It will be helpful in understanding the operation to examine a typical case.

Figure 19:
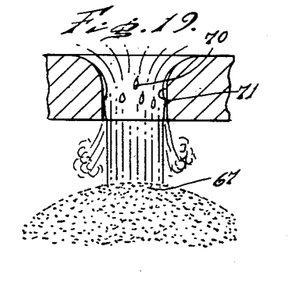
FIGURE 19 is a diagrammatic axial section of an orifice illustrating steam pockets.

For an initial pressure of 100 p.s.i.g. the velocity of steam flow through an orifice is aproximately 10 times the velocity of water flow. Entrained steam bubbles in water and moving with the water stream therefore displace 10 times the cross sectional area of the flow stream as compared to the same mass rate of flow with phase separation. If the steam liberated from the periphery of the water stream could therefore be vented to the discharge without entrainment in the liquid, it would provide an advantage up to 10 to 1 over entrainment of the steam in a metastable water core passing through the orifice. Since the rate of steam release from the water core is a function of the exposed surface area, the foregoing must be supplemented by the effect of increased liquid interface area of the entrained bubbles and their growth in transit along the flow stream. FIGURE 19 shows possible partial entrainment of liberated surface steam to the detriment of flow efficiency. There are steam pockets 70 distributed through the flow and some at 71 on the surface of the orifice, and the non-continuous venting of the steam pockets lowers the mean steam velocity.

The effect of turbulence and the magnitude of forces associated with pressure waves in relation to the velocity of surface tension forces to maintain metastable state is, of course, the dominant consideration. If turbulence creates pressure waves in excess of the surface tension control forces, the liquid may in effect be triggered to move from metastability to stability.

Figure 20:
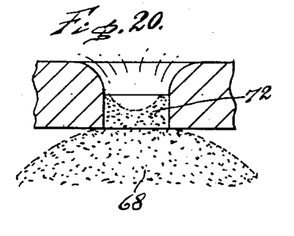
FIGURE 20 is a diagrammatic axial section illustrating stable flow.

FIGURE 20 shows turbulent flow in which the transition moves into the orifice throat at 72.

Figure 22:
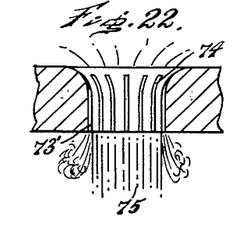
FIGURE 22 is a diagrammatic axial section of the orifice of FIGURE 21.

It will be apparent from the above discussion that the greatest flow efficiency of supersaturated liquid with respect to the discharge pressure that can be achieved through an orifice will be under conditions of streamlined non-turbulent passage with a maximum cross section of the liquid core consistent with a provision for venting of liberated surface steam to the discharge as a separate phase from the liquid. FIGURES 21 and 22 show an orifice having longitudinal recesses or grooves 74 which permit a vapor envelope 73' to vent to discharge through the grooves, while maintaining a liquid core discharging at 75. Thus high velocity venting through the longitudinal grooves is assured.

The physical flow conditions of stable and metastable flow through an orifice can be appreciated from the following cases. These are based upon consideration of a steam trap and its response pressures in relation to the initial pressure.

In the case of stable flow where the metastable liquid moves to the stable state within the confines of the orifice as shown in FIGURE 20, we can develop the vapor pressure relations of the fluid to the chamber pressure which will just permit valve lift and in turn develop the discharge temperature for this condition.

Considering a case having an initial pressure on the inlet side to the orifice of 100 p.s.i.g., the series orifice relationship of the steam trap as here shown will give a chamber pressure on cold water of 68 p.s.i.g. For the particular steam trap considered in this example, the chamber pressure for valance of the valve on its seat is 85 p.s.i.g.

If $P_v$ represents the vapor pressure of the fluid, and $C_1A_1$ and $C_2A_2$ represent the respective coefficients and the respective sectional areas of the first and second orifices in the steam trap respectively (the physical relationship is shown in FIGURE 23), the following two equations will apply:

$$C_1A_1\sqrt{100-68}=C_2A_2\sqrt{68}$$

$$C_1A_1\sqrt{100-85}=C_2A_2\sqrt{85-P_v}$$

Solving for $P_v$ $$P_v=85-15\left(\frac{C_1A_1}{C_2A_2}\right)=85-31.8=53.2 \text{ p.s.i.g.}$$

The temperature corresponding to this vapor pressure is 301° F.

If we make allowance for variation in adjustment of the trap, the discharge temperature under the above conditions of stable flow would vary from 294° F. to 304° F. This is typical for the operation of a steam trap having a relatively poor control orifice.

In the case of metastable flow through the orifice and liberation of a vapor envelope as the liquid passes through, is is possible to calculate the fluid restriction of the liquid core brought about by the steam envelope to such a degree that the chamber pressure corresponds to balance of the valve. If we apply principles of hydraulic flow to these conditions, the basic formula will apply:

$$F=CA\sqrt{2GH}$$

where F is the quantity of flow, C is the coefficient, A is the cross sectional area of the orifice, G is the acceleration of gravity, and H is the head.

If we equate the flow through each of the orifices by reason of the flow continuity and cancel the common factors, we can express the relation as:

$$C_1A_1\sqrt{P_1-P_x}=C_2A_2\sqrt{P_x}$$

where $P_1$ is the initial pressure and $P_x$ is the intermediate pressure. From this relationship by substituting actual values for cold water flow, we determine the ratio:

$$\frac{C_1A_1}{C_2A_2}=\sqrt{\frac{68}{32}}$$

The coefficient $C_3$ which would represent the flow contraction caused by the vapor envelope as applied to the condition of balance of the valve can then be calculated:

$$C_3 = \frac{C_1 A_1}{C_2 A_2} \sqrt{\frac{P_1 - P_x}{P_x}}$$

Figure 24:
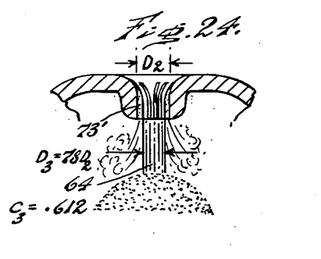
FIGURE 24 is a diagrammatic axial section of a portion of a similar steam trap showing metastable discharge conditions.

Substituting for $$\frac{C_1 A_1}{C_2 A_2} \text{ the value of } \sqrt{\frac{68}{32}}$$

and for $$\sqrt{\frac{P_1 - P_x}{P_x}} \text{ the value of } \sqrt{\frac{15}{85}}$$

and solving, we determined that $C_2 = 0.612$ inches. This in turn can be converted to diameter relations, bearing in mind that the area varies as the square of the diameter. $D_3 = .78 D_2$, where $D_2$ is the diameter of the orifice and $D_3$ is the diameter of the discharging core as shown in FIGURE 24 for metastable discharge conditions, there being a vapor envelope at 73' inside the orifice and around the core.

In other words, if the vapor envelope 73' reduces the liquid core diameter by 22% of the original orifice diameter, the flow will be reduced to such a degree that the chamber pressure will correspond to balance of the valve.

Test results on production steam traps indicate that an orifice having a polished wall can develop a mean discharge temperature of about 318° F. with an initial pressure of 100 p.s.i.g. This is definitely in the metastable flow region, and for this discharge condition the mean effect of the contraction coefficient is 0.61 which corresponds to a liquid core reduction to 0.78 of the orifice diameter. Presumably the surface emission of steam from the liquid core on passage through the orifice is the primary cause of such contraction.

In the case of the standard steam trap of the type indicated in the drawings of the so-called ½-inch size, the control orifice diameter is 0.036 inch and the steam envelope is approximately 0.004 inch thick. With such a comparatively thin film, the outwardly directed steam emission and the large surface drag, the mean steam velocity may not greatly exceed the core velocity.

This fact is further supported by the velocity distribution across a normal flow section, which diminishes considerably below the mean in the vicinity of the containing wall. In free flow, however, the steam velocity would approach a critical velocity of about 1500 feet per second as compared to the water flow velocity at approximately 110 feet per second, with an initial pressure of 100 p.s.i.g. If the mean velocity of the steam phase could more closely approach this theoretical maximum, it would provide more core section for liquid flow and thus increase the efficiency of the orifice.

It would appear that grooves in the orifice wall serve to channel off the orifice steam into flow sections which develop more clearly defined phase separation and cross sections of larger minimum dimensions. This favors higher velocities with smaller liquid core contractions. If the steam velocity were doubled, for example, which is a conservative assumption in view of the 13 to 1 ratio in relative phase velocities, the contraction would reduce to one-half and the liquid core would be correspondingly enlarged. This would reduce the chamber pressure of the trap and increase the temperature of the discharge to a very significant extent.

At 328° F. the chamber pressure for valve lift is at the saturation value and this represents the highest temperature where the fluid will enter the orifice as a single liquid phase. If flow conditions for this performance are satisfied, operation of the trap can be assured practically up to steam temperature. This is so because at temperatures above this range the fluid will liberate flash steam in the first orifice (piston clearance in the cylinder), with corresponding decrease in the incoming flow which further reduces the chamber pressure. In addition, phase separation at the entrance of the control orifice tends to impart fluctuations in chamber pressure which favor valve response.

Test information indicates that the above performance is achieved by the expedient of providing longitudinal grooves in the side wall of a properly formed orifice.

It will be evident that facilitation of surface steam discharge at high velocity and efficiency through the provision of grooves in the orifice wall, with corresponding increase in the overall coefficient of saturated water through an orifice of given steam flow capacity, results in a marked performance improvement as measured by the condensate discharge temperature. Not only does it substitute the relatively inexpensive process of stamping for the previously high cost machining and polishing, but it actually produces a superior result and permits establishment of a new level of performance by reason of higher efficiency present in the new device.

Aside from the contribution made by the grooves in the orifice wall, and other previously enumerated advantages of the stamped orifice component, there is another feature which is significant. The comparative insulation of the orifice walls from the valve body tends to maintain the orifice walls cooler than if they were initially integral with the valve body and therefore subject to heating from the parts of the valve body which are normally exposed to higher temperatures incident to initial trap pressures. The thin disc not only reduces heat transfer from the parts of the valve which are at initial temperature and pressure conditions to the orifice, but also provides more surface exposed to discharge temperature on the underside of the orifice, thus tending to reduce the orifice temperature to a level below that of the fluid in the chamber.

The throat is so short that the discharge temperature prevails well up in the bore, and this tends to maintain the orifice cooler.

The coolness of the orifice favors retention of the fluid in the metastable condition and tends to suppress the volume of liberated surface steam. This is therefore another favorable performance factor introduced by the device of the invention.

For best results it is believed the groove depth should be not more than 8%, and preferably not more than 6%, and most desirably not more than 5% of an orifice throat diameter, 5% being considered the optimum depth. It is believed that the depth of the groove should for best results exceed 1% of the orifice throat diameter. The grooves should be smooth and continuous along the orifice wall in the axial dimension.

Figures 25, 26, 27, 28, 29, 30, 31:
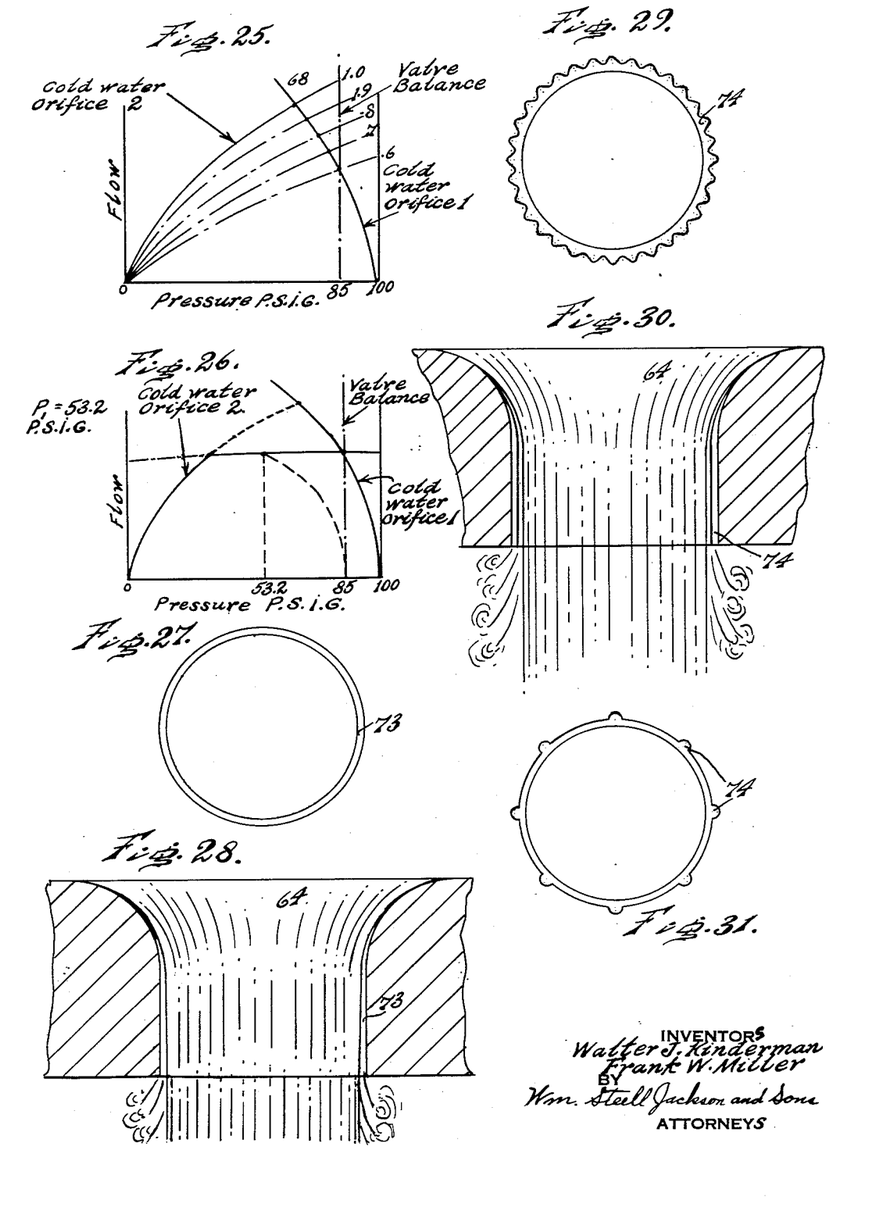
FIGURES 25 and 26 are graphs plotting flow against pressure in a steam trap, showing respective metastable and stable discharge conditions.
FIGURE 27 is a fragmentary plan view of an orifice having a polished wall showing the liquid core.
FIGURE 28 is a fragmentary diagrammatic axial section of the orifice of FIGURE 27 showing the liquid core and steam envelope.
FIGURE 29 is a fragmentary diagrammatic plan view of an orifice according to the invention showing grooves constructed in accordance with a sine wave and illustrating the liquid core.
FIGURE 30 is a fragmentary axial section of the orifice of FIGURE 29.
FIGURE 31 is a fragmentary plan view showing an orifice having 8 equally distributed grooves around the circumference and extending longitudinally in accordance with the invention.

FIGURES 29 and 30 show the better phase separation, higher velocity of the steam envelope and correspondingly less contraction of the liquid core with higher flow efficiency obtained by a series of grooves 74 which run longitudinally of the orifice, as compared with the orifice of FIGURES 27 and 28 which has no such longitudinal grooves and contains the thin steam envelope 73 with high surface drag, and converging interfaces typical of the ungrooved form. Both of these orifices have metastable flow with supersaturated water emitting steam from the liquid core 64. The cross sectional contour of the longitudinal grooves 74 in FIGURES 29 and 30 is suitably of sine wave approximation.

Most excellent results can be and have been secured by steam traps including punch formed orifices made by the following technique and having the following characteristics:

The entrance curvature is on an average radius of about one-half the throat diameter, blending in well with the throat and the radius being greater close to the throat than further away. The throat length is about one-half the throat diameter. After formation by punch methods, and longitudinal polishing in which care is taken not to carry the polishing far enough to destroy the contour, the surface is longitudinally scribed in anywhere from 8 to 16 places evenly spaced around the entire perimeter. Each mark runs continuously from the end of the orifice away from the mouth in a straight line parallel to the orifice axis through the entire throat and then in its same plane on the surface of the entrance curvature back to a point about half-way along on the entrance curvature. The depth of each mark in the throat is about 5% of the throat diameter, or more specifically about 0.002 inch in the throat (with a throat diameter on the order of 0.040 inch), and the mark has a gradually lessening depth in the entrance curvature. The lines in the throat are believed to be more or less similar to each other in depth and in cross sectional configuration, with a rounded bottom and sloping sides.

With steam traps with such orifices, experiments showed extremely satisfactory results. Comparing them with the same steam trap after the orifice had been polished but before the lines had been introduced, the trap in every case discharged at a higher condensate temperature in the case of the trap with the lines than had the same trap after polishing but without the lines. While the amount of improvement varied from trap to trap, dependent doubtless on various other individual factors as a practical matter, it was in every case a substantial percentage of the difference between the temperature of steam in the steam line and the discharge temperature of the trap with the polished orifice before lining, and averaged about 46% of that difference.

In Figure 31 we illustrate an arrangement having 8 grooves 74 extending longitudinally of the orifice, and showing the core of the stream flow by the separate interior circle.

It will be evident that given a particular set of longitudinal grooves having a particular set of characteristics, it is not important how the longitudinal grooves have been introduced, and possible ways of introducing them include introducing them as an incident to a normal punch operation, or by a special tool, or by an abrasive or other means.

FIGURES 25 and 26 illustrate a comparison between the behavior for metastable operation and for stable operation. In metastable operation, as shown in FIGURE 25, flow curves of chamber pressure are illustrated with restriction of the liquid flow core by surface steam emission on passage through the second orifice. Restriction is given in terms of orifice coefficient where the orifice coefficient for cold water flow is 1.0.

FIGURE 26, being the case of stable flow, shows flow curves of chamber pressure showing critical flow through the second orifice where $P_V=53.2$ p.s.i.g. and the condensate temperature is 301° F.

The longitudinal marks of the present invention also will tend to eliminate vortex flow which could develop and would be unfavorable to the continuance of the metastable state for various reasons.

It will be understood that in the showings of flow through the orifice, and especially in the showings of that flow in the case of flow through orifices having longitudinal marks, the circumferential part of the vapor envelope is likely to be shown exaggerated in relative thickness for ease of visualization. For example, in FIGURES 29 and 30, it is believed the circumferential part of the film is actually relatively much thinner than shown.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. A steam trap control valve head comprising a disc of metal having a central orifice which has an entrance rounded in longitudinal section and is smooth except as mentioned below in the axial direction of flow as distinguished from the circular direction around the orifice, the surface having striations in it running in said axial direction of flow, and an external flange forming a piston, a tubular plunger secured in pressure-tight relation to one side of the disc, having a valve element at the outside at a point remote from the disc, and having a bore running lengthwise and communicating with the orifice.

2. A steam trap control valve head according to claim 1, in which the disc is cupped, and the piston is located at a position toward the opposite end of the plunger from the orifice and the cup is secured in pressure-tight relation to the plunger around the outside.

3. A steam trap piston valve head, comprising a tubular body having a bore, a piston around the outside of the body at one end, a valve element around the outside of the body toward the other end with respect to the piston, and an orifice extending through the piston into the bore at the end adjoining the piston, having an entrance curve in the planes passing through its longitudinal axis and a throat and having marks extending only generally longitudinally of the orifice, said orifice being otherwise smooth, and the entrance curve being on a radius of at least ⅜ of the throat diameter.

4. A piston valve head for steam trap, comprising a tubular body having a bore, having a valve element around the outside thereof located toward one end and having a piston around the outside adjacent the opposite end, and having an orifice extending at the center of the end adjoining the piston into the bore, the orifice having an entrance curvature in planes passing through its longitudinal axis and a throat, the entrance curvature being on a radius of between ⅜ and ¾ of the throat diameter, and the orifice having marks in the orifice which extend only in a direction generally longitudinal of the orifice, said orifice being otherwise smooth in a generally longitudinal direction.

5. A piston valve head for steam trap, comprising a tubular body having a bore, having a valve element around the outside thereof located toward one end and having a piston around the outside adjacent the opposite end, and having an orifice extending at the center of the end adjoining the piston into the bore, the orifice having an entrance curvature in planes passing through its longitudinal axis and a throat, the entrance curvature being on a radius of between ⅜ and ¾ of the throat diameter, the entrance curvature joining the piston surface around the outside of the entrance curvature at an angle of less than 20°, and the orifice having marks which extend only in a direction generally longitudinal of the orifice, said orifice being otherwise smooth in the general direction in which the marks extend.

6. A piston valve head for a steam trap having a tubular body, having an external valve located toward one end and having an external piston adjacent the other end, having a bore extending through the body from the end remote from the piston to a point adjoining the end adjacent the piston, having an orifice through the end of the valve element adjacent the piston into the bore, the orifice having an entrance curvature in planes passing through its longitudinal axis and a throat, the entrance curvature being on a radius between ⅜ and ¾ of the throat diameter, having a throat length in excess of one half of the throat diameter and having marks in the throat which extend only generally longitudinally thereof, said throat being otherwise smooth in the general longitudinal direction.

7. A piston valve head for a steam trap comprising a disc, a tubular plunger secured in pressure-tight relation to one side of the disc, the disc extending outwardly beyond the plunger to form a piston, the plunger having a valve element around its outside, the disc having an orifice at the center extending into the tubular bore of the plunger, the disc being relatively hard at the orifice and the piston, and the plunger being relatively hard at the valve element, and the disc and the plunger being relatively soft where they are secured together, and said orifice being circular in overall cross section and having a curvature in longitudinal section starting on the side of the disc away from the plunger at an angle of less than 20° with that side and coming inward toward the longitudinal axis of the orifice as it goes toward the plunger and ending when it becomes parallel with said axis in the interior of said disc at which point the throat of the orifice begins, and there being striations in the outline of the surface of the orifice which striations run smoothly in a direction longitudinally of the orifice, the orifice being otherwise smooth in said longitudinal direction, but being rough in a transverse direction on account of the striations.

8. In a steam trap having a control chamber, a control orifice on the outlet side of the control chamber, the control orifice having a throat and having an entrance curvature longitudinal of the orifice, the walls of the orifice including a plurality of linear depressions running longitudinal of the orifice.

9. A steam trap having a control chamber and a control orifice having a throat and having an entrance curvature longitudinally of the orifice which entrance curvature leads into the throat and has a radius of curvature at least equal to ⅜ of the smallest distance across the throat throughout at least that half of the curvature adjacent the throat, and which orifice has a surface configuration including a plurality of marks running longitudinal of the orifice.

10. A steam trap having a control chamber and having a control orifice on the outlet side of the control chamber, the control orifice having a throat and having an entrance curvature longitudinal of the orifice, the walls of the orifice including a plurality of linear depressions running longitudinal of the orifice, the linear depressions having a depth which does not exceed 8 percent of the smallest dimension across the orifice.

11. A steam trap having a control chamber and a control orifice on the outlet side of the control chamber, the control orifice having a throat and having an entrance curvature longitudinal of the orifice, the walls of the orifice including at least 8 linear depressions running longitudinal of the orifice and circumferentially distributed generally equally around the wall of the orifice.

12. A steam trap having a control chamber and having a control orifice on the outlet side of the control chamber, the control orifice having a throat and having an entrance curvature longitudinal of the orifice, the walls of the orifice throat including at least 8 longitudinal linear depressions spaced around the orifice, said depressions having a depth not exceeding 6 percent of the minimum dimensions across the orifice.

13. A steam trap having a control chamber and a control orifice on the outlet side of the control chamber, the control orifice having a throat and having an entrance curvature longitudinal of the orifice, the walls of the entrance curvature having a plurality of linear depressions running longitudinally with respect to the orifice.

14. A steam trap having a control chamber and a control orifice on the outlet side of the control chamber, the control orifice having a throat and having an entrance curvature longitudinally of the orifice, the walls of the orifice throat including a plurality of linear depressions running longitudinally of the orifice, said depressions in cross section having the configuration of a sine wave.

15. A steam trap for releasing condensate from a steam chamber to discharge, comprising a main discharge passage from the steam chamber to discharge, a valve element controlling that passage, a control chamber controlling operation of that valve element, a chamber inlet passage bringing fluid originating in the steam chamber into the control chamber, an outlet passage removing fluid from the control chamber for discharge and including a control orifice, which control orifice has a plurality of longitudinal grooves.

16. A steam trap having a control chamber and a control orifice on the outlet side of the control chamber, which control orifice has a throat and an entrance curvature longitudinal of the orifice, which throat has a surface configuration including a plurality of marks running longitudinally of the orifice.

17. A steam trap having a control chamber and having a control orifice on the outlet side of the control chamber, the control orifice having a throat and having an entrance curvature longitudinal of the orifice, the walls of the orifice having a plurality of longitudinal marks on the throat and the portion of the entrance curvature near the throat.

18. A steam trap having a control chamber and a control orifice on the outlet side of the control chamber, the control orifice having a throat and having an entrance curvature longitudinally of the orifice, the walls of the orifice including a plurality of linear depressions running longitudinally of the orifice and each running continuously all the way from the end of the throat away from the entrance curvature to a point in the entrance curvature.

19. A steam trap having a control chamber and a control orifice on the outlet side of the control chamber, the control orifice having a throat and having an entrance curvature longitudinally of the orifice, the walls of the orifice including a plurality of linear depressions running longitudinally of the orifice and each running continuously all the way from the end of the orifice throat to around the midpoint of the entrance curvature, the depressions having a depth of 5% of the least distance across the throat when they are in the throat.

20. A steam trap to remove condensate from a steam chamber to discharge, comprising a main passage from steam chamber to discharge, a valve element seat in the passage, a valve for the passage having a restrictive position and an open position relative to the valve seat, a control chamber influencing action of the valve element, and a control orifice in communication with the control chamber at least when the valve is in restrictive position and having marks in its surface running longitudinally of flow through the orifice.

References Cited in the file of this patent

UNITED STATES PATENTS

| | | |
|---|---|---|
| 795,448 | McGonagle | July 25, 1905 |
| 1,721,630 | Kropp | July 23, 1929 |
| 1,748,402 | Taylor | Feb. 25, 1930 |
| 2,051,732 | McKee | Aug. 18, 1936 |
| 2,127,649 | McKee | Aug. 23, 1938 |
| 2,246,078 | Rohn | June 17, 1941 |
| 2,407,561 | Lincoln | Sept. 10, 1946 |

OTHER REFERENCES

Fluid Flow Through Two Orifices in Series—II, by Stuart et al., from Transactions of A.S.M.E. for July 1944, pp. 387–397.